(12) United States Patent
Speckin et al.

(10) Patent No.: US 10,495,391 B2
(45) Date of Patent: Dec. 3, 2019

(54) FLUME APPARATUS AND METHOD FOR MODULAR HEAT EXCHANGE TOWER

(71) Applicant: SPX Cooling Technologies, Inc., Overland Park, KS (US)

(72) Inventors: Mark Speckin, Shawnee, KS (US); Aaron Folken, North Kansas City, MO (US); Dustin Jenkins, Olathe, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 146 days.

(21) Appl. No.: 15/269,386

(22) Filed: Sep. 19, 2016

(65) Prior Publication Data

US 2017/0343306 A1    Nov. 30, 2017

Related U.S. Application Data

(60) Provisional application No. 62/341,876, filed on May 26, 2016.

(51) Int. Cl.
| | |
|---|---|
| *F28F 25/04* | (2006.01) |
| *F28C 1/04* | (2006.01) |
| *F28F 25/10* | (2006.01) |
| *E04H 5/12* | (2006.01) |
| *F28F 25/02* | (2006.01) |
| *F28C 1/00* | (2006.01) |
| *F28C 1/14* | (2006.01) |
| *F28F 25/00* | (2006.01) |

(52) U.S. Cl.
CPC .............. *F28F 25/04* (2013.01); *E04H 5/12* (2013.01); *F28C 1/00* (2013.01); *F28C 1/04* (2013.01); *F28C 1/14* (2013.01); *F28F 25/02* (2013.01); *F28F 25/10* (2013.01); *F28F 2025/005* (2013.01)

(58) Field of Classification Search
CPC ...... E04H 5/12; F28C 1/00; F28C 1/04; F28C 1/14; F28F 25/02; F28F 25/04; F28F 25/10; F28F 2025/005
USPC .............................. 261/30, 97, 110, DIG. 11
See application file for complete search history.

(56) References Cited

U.S. PATENT DOCUMENTS

| | | | | |
|---|---|---|---|---|
| 3,262,682 A | * | 7/1966 | Bredberg | B01D 50/00 261/112.2 |
| 3,363,885 A | * | 1/1968 | Meek | F28C 1/04 261/111 |
| 3,754,738 A | | 8/1973 | Blazer et al. | |
| 5,143,658 A | * | 9/1992 | Thomas | B01J 19/32 261/112.2 |

(Continued)

FOREIGN PATENT DOCUMENTS

| | | |
|---|---|---|
| CH | 681 821 A5 | 5/1993 |
| DE | 11 11 220 B | 7/1961 |
| JP | S57-142483 A | 9/1982 |

*Primary Examiner* — Charles S Bushey
(74) *Attorney, Agent, or Firm* — BakerHostetler

(57) ABSTRACT

The present disclosure relates to a modular heat exchange tower including a first module having a first basin disposed therein and a second module having a second basin disposed therein. The aforementioned modular heat exchange tower may also include heat exchange sections, which are disposed in the first module and the second module. The first module and the second module may be assembled prior to being transported to a job site and installed in the modular heat exchange tower.

18 Claims, 14 Drawing Sheets

(56) References Cited

U.S. PATENT DOCUMENTS

| | | | | |
|---|---|---|---|---|
| 5,242,627 A | * | 9/1993 | Lundin | B01J 19/32 |
| | | | | 261/112.2 |
| 5,431,858 A | * | 7/1995 | Harrison, Jr. | F28F 25/02 |
| | | | | 261/111 |
| 6,070,860 A | | 6/2000 | Kinney et al. | |
| 2003/0085477 A1 | * | 5/2003 | Kinney, Jr. | F28C 1/00 |
| | | | | 261/110 |
| 2003/0173688 A1 | * | 9/2003 | Koo | F28C 1/06 |
| | | | | 261/109 |
| 2017/0343306 A1 | | 11/2017 | Speckin et al. | |
| 2017/0343307 A1 | * | 11/2017 | Speckin | F28C 1/04 |

* cited by examiner

FIG. 4 SECTION A-A

FLUME APPARATUS AND METHOD FOR MODULAR HEAT EXCHANGE TOWER

RELATED APPLICATIONS

This application claims priority to U.S. Provisional Application No. 62/341,876, titled Improved Flume Apparatus and Method for Modular Heat Exchange Tower, filed May 26, 2016, the disclosures of each which are hereby incorporated by reference in their entirety.

FIELD OF THE INVENTION

The present disclosure relates generally to modular heat exchange towers. The present disclosure also relates to methods of assembling modular heat exchange towers. More particularly, the present disclosure relates, for example, to modular components of heat exchange towers, each having separate water basins disposed therein, that can be pre-assembled in a factory setting and transported to a job site and assembled to erect a cooling tower.

BACKGROUND OF THE INVENTION

Cooling towers are heat exchangers of a type widely used to emanate low grade heat into the atmosphere and are typically utilized in electricity generation, air conditioning installations, and the like. These towers receive a relatively warm or hot fluid, and pass the fluid through the tower apparatus so that heat is extracted from the fluid by interaction with relatively cooler ambient air.

Cooling towers generally include counter-flow type cooling towers and cross-flow type cooling towers. In a counter-flow cooling tower, liquid of high temperature is cooled as it flows downwards through fill or packing and is brought into contact with air traveling upwards. Conversely, in a cross-flow cooling tower, liquid of high temperature is cooled with air that moves horizontally through the fill or packing. The heated air is exhausted into the atmosphere using a fan, and the cooling liquid is collected in a basin situated below the fill or packing.

Liquid is generally distributed through a cooling tower in one of two ways: gravity and spray. Typically, gravity systems are used in cross-flow cooling towers, and spray systems are used in counter-flow cooling towers. In a spray system, liquid of high temperature is distributed through the cooling tower using a series of spray nozzles mounted on distribution pipes. The spray nozzles are arranged to evenly distribute the liquid over the top of the fill. Once the liquid travels through the fill, it is collected at the bottom of the tower in a cold liquid basin. In a gravity system, liquid of high temperature is fed into a hot liquid basin disposed above the fill. The liquid then travels through holes or openings in the bottom of the hot liquid basin to the fill. Similar to the spray system, liquid that travels through the fill is collected at the bottom of the tower in a cold liquid basin.

A drawback associated with current cooling towers is that in some applications they can be very labor intensive in their assembly at the job site. The assembly of such towers oftentimes requires a dedicated labor force investing a large amount of hours. Accordingly, such assembly is labor intensive requiring a large amount of time and therefore can be costly. Uncertainties such as weather and site conditions may also affect the time required to assemble cooling towers at a job site. The quality of the labor force may also lead to quality and performance issues associated with the towers. Thus, it is desirable to assemble as much of the tower structure at the manufacturing plant or facility, prior to shipping it to the installation site.

But while it may be desirable to assemble tower components at a factory, conventional designs for cooling towers oftentimes necessitate their assembly at a job site. For example, factors such as the size of the various tower components and their structural strength may limit their ability to be manufactured at the factory and transported onsite. One particular component that may present assembly and transportation challenges is the liquid collection basin or commonly referred to as the cold water basin. Many conventional cooling towers are constructed with a single cold water basin for receiving and holding water that has been cooled by the tower. Due to the size of the cold water basin, it is costly to transport it in pre-assembled form to a job site. In cooling towers with a single cold water basin, the size of the cold water basin also increases as the towers increase in cooling capacity. While a solution may be to ship the cold water basin in multiple components to a job site for final assembly, such leads to greater labor costs and inconsistent quality in assembly due to on-site conditions such as those described above. Moreover, it oftentimes is difficult to ensure that the various components of the cold water basin are fully sealed to one another at a job site.

Therefore, it is desirable to have a cooling tower that is assembled using components that can be manufactured in a factory and transported to a job site. In particular, it is desirable to have a cooling tower that can be assembled with modular components, including components that have pre-assembled cold water basins.

SUMMARY OF THE INVENTION

Embodiments of the present disclosure advantageously provide for modular heat exchange towers and methods of assembling such modular heat exchange towers.

An embodiment of the disclosure is a modular heat exchange tower, comprising: a first module comprising a first basin disposed therein; a second module comprising a second basin disposed therein; a plenum; a first heat exchange section; and an air current generator.

Another embodiment is a modular heat exchange tower, comprising: a first collection basin module, wherein the first collection basin module comprises a first heat exchange portion and a first collection basin; a second collection basin module, wherein the second collection basin module comprises a second heat exchange portion and a second collection basin; a plenum module disposed between said first and second collection basin modules; and a fan module.

Another embodiment is a method of assembling a modular heat exchange tower, comprising: positioning a first collection basin module, wherein the first collection basin module comprises a first heat exchange portion and a first collection basin; positioning a second collection basin module laterally spaced apart from the first collection basin module, wherein the second collection basin module comprises a second heat exchange portion and a second collection basin; positioning a plenum module in the lateral space between the first collection basin module and the second collection basin module; and positioning a fan module vertically adjacent to the plenum module.

In yet another embodiment of the present invention, a modular heat exchange tower that extends vertically along a longitudinal axis, comprising: a first module comprising a first basin disposed therein; a second module that defines a plenum, wherein said second module comprises a outlet; a first flume connected to said outlet, wherein said flume extends from said second module to said first module, wherein said first flume comprises: a first linear base wall; a first linear side wall that extends from said linear base wall at an angle; and a second linear side wall that opposes said first linear side wall that extends at an angle from said base wall; a first heat exchange section; and an air current generator.

In still yet another embodiment of the present invention, a modular heat exchange tower that extends vertically along a longitudinal axis, comprising: a first module comprising a first basin disposed therein; a second module comprising a second basin disposed therein; a third module that defines a plenum, wherein said third module comprises a outlet; a first flume connected to said outlet, wherein said flume extends from said third module to said first module and has a curvilinear geometry; a first heat exchange section; and an air current generator.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

Figure 1:
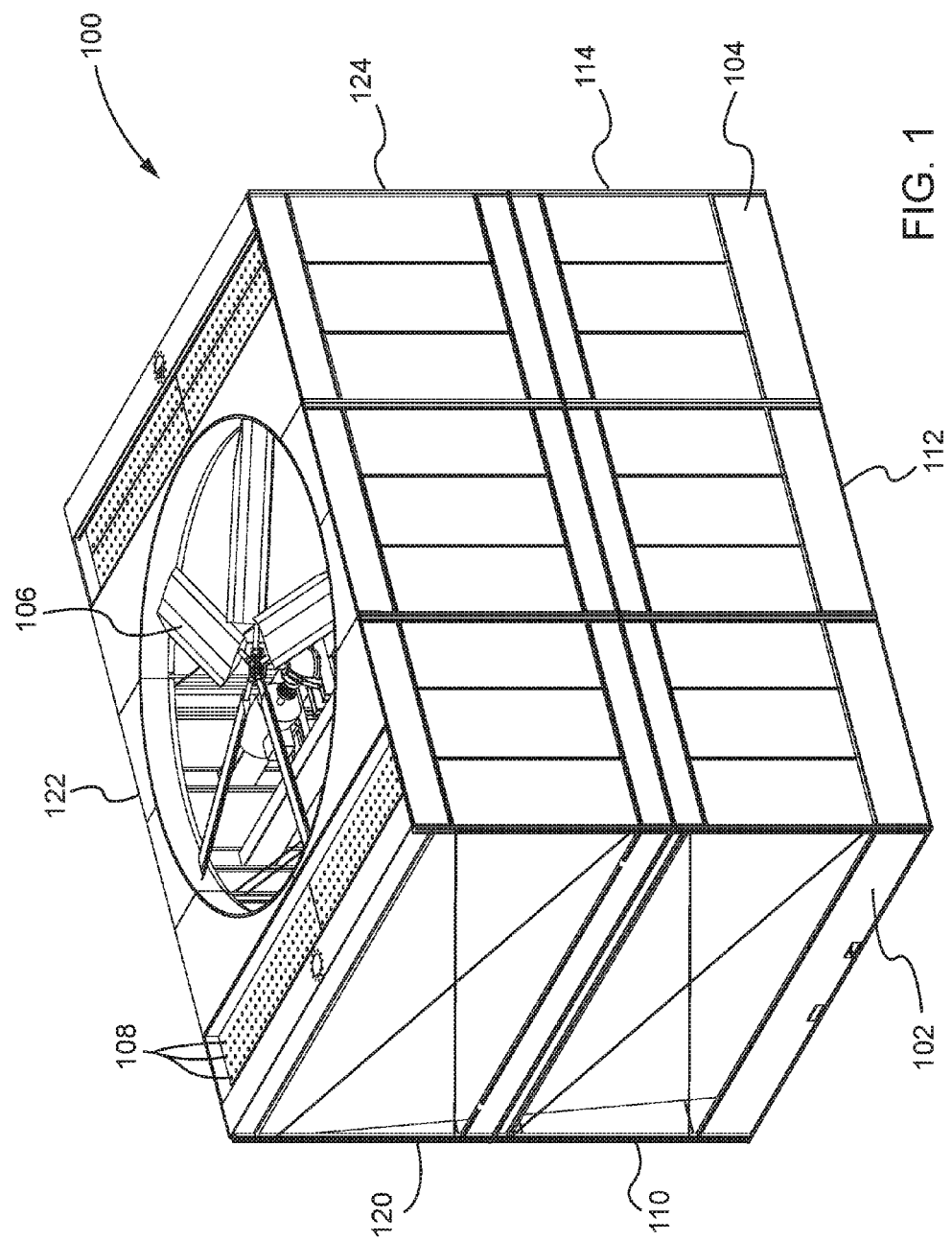
FIG. 1 is a perspective view of a first exemplary modular heat exchange tower in accordance with an embodiment of the present disclosure.

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Cooling towers regulate the temperature of relatively warm or hot fluid by passing the fluid through a tower apparatus that brings it into contact with relatively cooler ambient air. These towers typically include a hot liquid distribution system. Examples of these distribution systems may have a series of water distribution nozzles or an apertured distribution basin or the like, and a cold water collection basin positioned at the base or bottom of the cooling tower. Commonly, a water dispersing fill structure is disposed in the space between the hot water distribution system and the underlying cold water collection basin. The aforementioned fill structure oftentimes includes either a plurality of elongated, horizontally arranged and staggered splash bars supported at spaced intervals by an upright grid structure or frame assembly, or a series of fill packs or fill packing composed of a number of film fill sheets. During assembly of the evaporative cooling towers, typically, an outer shell or support structure is built first and then the fill media is installed. In the case of splash type fill, a rack or grid support is affixed to the support shell. Splash bars are then threaded into the rack. The splash bars generally provide a surface for consistent, predictable dispersal and breakup of the water droplets over a range of water loadings typically encountered during operation of the evaporative cooling tower. Typically, these splash bars are long and thin and the fill structure includes a great number of them. In the case of film fill, fill packs may be employed and installed into the support structure of the cooling tower. Fill packs may consist of individual sheets glued or attached by some other means to one another to make blocks. Alternatively, fill packs may consist of sheets hung from support members. Successive sheets are pushed on support members from one end and push down the support member until the support member is populated with the desired number of sheets. The fill packs are then placed in the support structure.

In a cross-flow tower, hot liquid is distributed over the fill section such that it comes into contact with cooler ambient air, which cools the hot liquid as the air travels horizontally or laterally through the fill section. These towers typically include an air inlet region that is disposed adjacent to the fill section, which allows air from outside of the tower to travel into the fill section. Generally, the dimensions of the air inlet region may correspond to the height of the fill section, allowing even distribution of air travel through the fill section. The tower also includes a plenum area or plenum chamber for receiving the air after it has traveled through the fill section, and a fan or other air current generator for directing the air into the atmosphere once again.

Hot liquid may be distributed in a cooling tower using a pipe distribution system. A pump may feed water into the pipes, which carry the water to nozzles that eject the water onto the fill section. The ejected water then travels through the fill section and is collected at the bottom in a cold liquid basin, which may have an opening (e.g., a pipe opening) for passing the cold liquid out of the cooling tower. As an alternative to a pipe distribution system, hot liquid may also be distributed in a cooling tower using water distribution basins having apertures for the water to flow through onto the fill section. Such as system is known as a gravity-driven distribution system. Once the liquid flows through the fill section and is cooled, it is similarly collected by a cold water basin, which may eject the cooled liquid to the outside.

Systems and methods disclosed herein provide a modular cross-flow cooling tower with a dual water collection basin design. The dual basin design allows for the separate basins to be pre-assembled in a factory and transported to a job site for installation into a cooling tower. Each of the basins may have dimensions that allow it to be economically transported to a job site. The dual basin design allows the cooling tower to be assembled with basins and other components that are smaller than a conventional cooling tower without sacrificing cooling capacity. In fact, larger capacities than previous conventional factory assembled cooling towers can be achieved. Furthermore, power conoutlettion per unit of cooling can be reduced with the use of larger fans not previously configurable in conventional factory assembled towers. As such, such systems and methods provide customers with a high capacity cooling product that is requires less on-site assembly time and laydown space and reduces transportation costs, installed product costs, safety concerns associated with on-site assembly, and downtime.

Conventional cooling towers typically include a single water collection basin that is costly to transport due to its size. For example, existing cooling towers may use cold water basins having a width of approximately fourteen (14) feet and therefore must be transported with special permit requirements. Examples of such permit requirements may include restrictions on the days and times of travel, route restrictions, escort requirements, lighting requirements, and tolls and other fee payments. These restrictions may differ from location to location, adding to the difficulty and cost of transportation.

Systems and methods disclosed herein may avoid the transportation problems associated with existing cooling towers by providing a cooling tower that is assembled with various modular components that do not exceed certain transportation size limits. For example, systems and methods disclosed herein may provide a cooling tower having six (6) modular components: two (2) bottom fill sections, two (2) top fill sections, a plenum section, and a fan section. Systems and methods disclosed herein may also provide a cooling tower having three (3) modular components: two (2) fill sections, and one (1) combined plenum and fan section. Each of these components may have dimensions that do not exceed certain transportation size limits. Therefore, the components may be transported without special oversize load requirements, thereby reducing transportation costs. Generally, very few states impose significant travel restrictions on loads that are ten (10) feet or less in width. Accordingly, such systems and methods disclosed herein may provide a cooling tower that can be assembled with various components that are each ten (10) feet or less in width. In particular, the containerized version may be 2.2 meters or less in width. While these modular components may require additional trucks for transporting to a job site—for example, multiple trucks may be needed to carry the separate components instead of a single oversized truck for carrying an entire cooling tower—the cost savings associated with not having an oversized load (e.g., for not having to pay for certain permit requirements) may outweigh the added cost of having additional trucks. Furthermore, when using larger capacity towers in larger capacity applications requiring multiple towers (e.g., cells), fewer towers or cells are required on site. Moreover, such systems and methods may provide a method for transporting and assembling cooling towers using factory-assembled components in regions that do not allow for the transportation of oversized loads.

System and methods disclosed herein also provide a cooling tower having modular components that can be transported in standard sea containers for international markets. For example, a standard sea container may have a door width of 7'6" and a door height of 7'5" and overall dimensions of 40'-by-8'-by-8'6". Accordingly, such systems and methods may provide modular components for a cooling tower that are sized to fit in such a container.

Referring now to FIG. 1, a first exemplary modular heat transfer tower 100 is depicted. The modular heat transfer tower 100 may be, for example, a cooling tower or the like. The modular heat transfer tower 100 may comprise six (6) modules including: a first collection basin module 110, a plenum module 112, a second collection basin module 114, a first heat exchange module 120, a fan module 122, and a second heat exchange module 124. The modular heat transfer tower 100 may also comprise a first water basin 102 and a second water basin 104. Water basins 102, 104 may be examples of the first basin and the second basin, as set forth in the claims.

The first water basin 102 may be disposed in the first collection basin module 110, and the second water basin 104 may be disposed in the second collection basin module 114. More specifically, the first water basin 102 may be disposed at a bottom portion of the first collection basin module 110, and the second water basin 104 may be disposed at a bottom portion of the second collection basin module 114. The first collection basin module 110 and the second collection basin module 114 may be laterally spaced apart from one another, and thus the first water basin 102 and the second water basin 104 may be laterally spaced apart from one another.

As depicted in FIG. 1, the water basins 102, 104 are separately sealed from each other. The water basins 102, 104 may be sealed in a factory prior to being transported to a job site for final assembly in the modular heat transfer tower 100. Alternatively, the water basins 102, 104 may be partially constructed in a factory and sealed at a job site. Furthermore, while the water basins 102, 104 are depicted as separately sealed units in FIG. 1, one of ordinary skill in the art would appreciate that the water basins 102, 104 need not be separately sealed but can be in fluid communication with one another such that they form a common basin.

As depicted in FIG. 1, the plenum module 112 is disposed in the space between the first collection basin module 110 and the second collection basin module 114. Together, the first collection basin module 110, the plenum module 112, and the second collection basin module 114, may form a first layer—specifically, a bottom layer or base—of the modular heat transfer tower 100.

In a separate layer—specifically, a top layer—the first heat exchange module 120, the fan module 122, and the second heat exchange module 124 may be disposed. The first heat exchange module 120 may be disposed above the first collection basin module 110 or, in other words, the first heat exchange module 120 may be disposed vertically adjacent to the first collection basin module 110. And the second heat exchange module 124 may be disposed above the second collection basin module 114 or, in other words, the second heat exchange module 124 may be disposed vertically adjacent to the second collection basin module 114. The heat exchange modules 120, 124 may be disposed vertically adjacent to the collection basin modules 110, 114 in a longitudinal direction. The collection basin modules 110, 114 and the heat exchange modules 120, 124 may have openings along their exterior sides for allowing air from outside of the modular heat transfer tower 100 to travel into the modular heat transfer tower 100 or, specifically, to travel into the collection basin modules 110, 114 and the heat exchange modules 120, 124.

The fan module 122 may be disposed vertically adjacent to the plenum module 112. Both the plenum module 112 and the fan module 112 may comprise hollow chambers for receiving air travelling through the collection basin modules 110, 114 and the heat exchange modules 120, 124 from outside of the modular heat transfer tower 100. The fan module 122 may also include a supporting attachment for holding a fan cylinder and a fan 106. The fan 106 may be an example of an air current generator, such as a fan or impeller. The fan 106 may pull the air that travels through the collection basin modules 110, 114 and the heat exchange modules 120, 124 from the outside atmosphere into the plenum module 112 and the fan module 122 and back out into the atmosphere.

Figure 3:
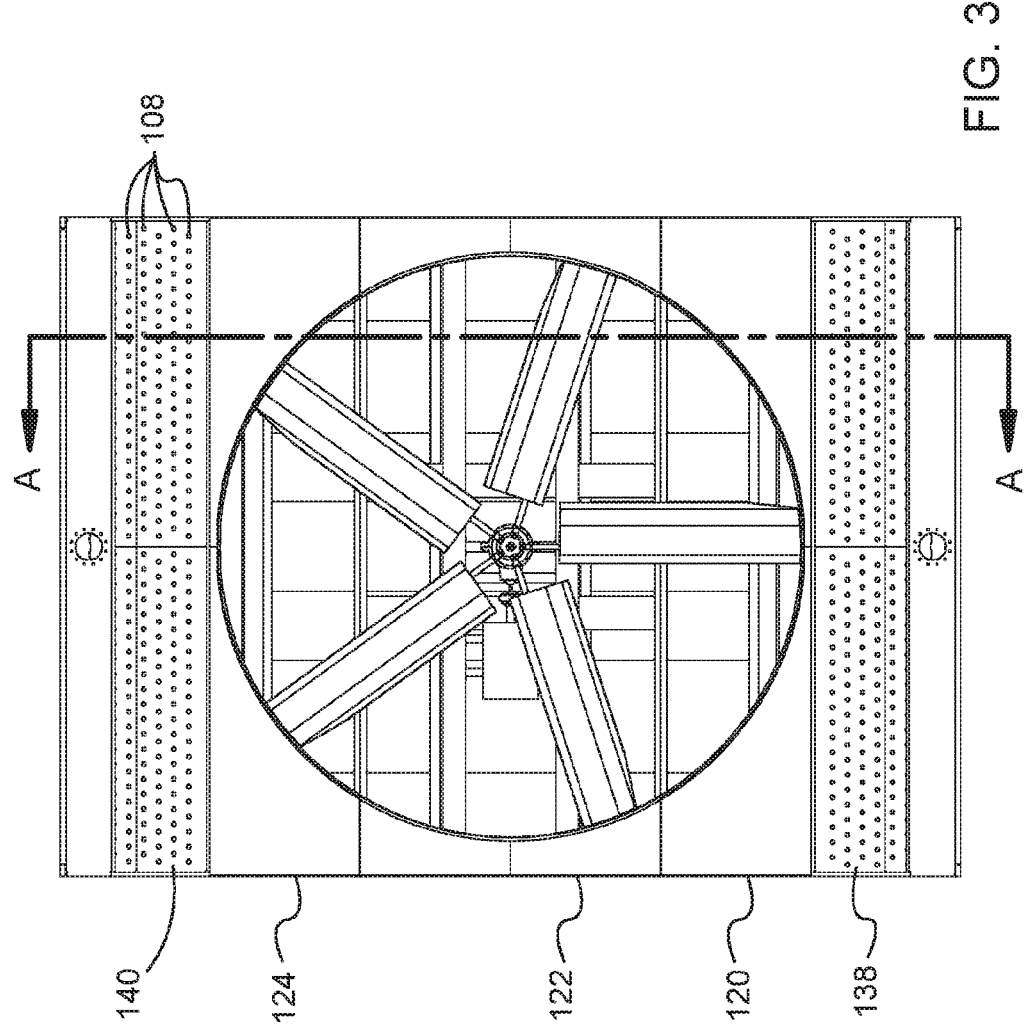
FIG. 3 is a top view of the modular heat exchange tower depicted in FIG. 1 showing an air current generator in accordance with an embodiment of the present disclosure.
Figure 4:
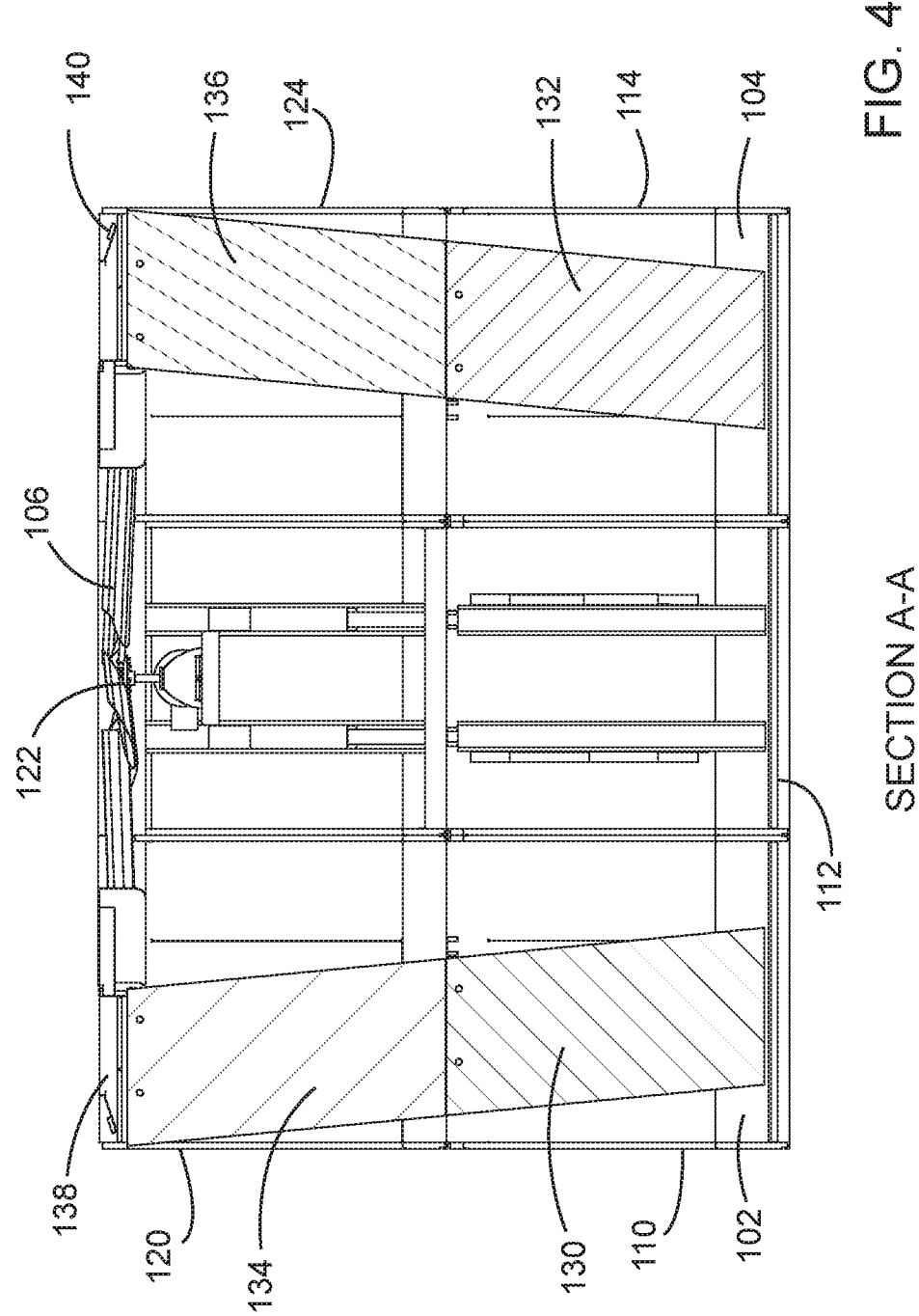
FIG. 4 is a cross-sectional view of the modular heat exchange tower depicted in FIG. 1 showing a plurality of heat exchange portions in accordance with an embodiment of the present disclosure.

Additionally, the modular heat transfer tower 100 may comprise a first hot water basin 138 and a second hot water basin 140 (see, e.g., FIGS. 3 and 4). The first hot water basin 138 may be disposed in the first heat exchange module 120, and the second hot water basin 140 may be disposed in the second heat exchange module 124. More specifically, the first hot water basin 138 may be disposed in a top portion of the first heat exchange module 120, and the second hot water basin 140 may be disposed in a top portion of the second heat exchange module 124. Each of the first hot water basin 138 and the second hot water basin 140 may comprise a plurality of openings or apertures 108. The openings may be configured to allow a liquid that is placed in the hot water basins 138, 140 to travel out of the hot water basins 138, 140 and into lower regions of the modular heat transfer tower 100 typically via nozzles—specifically, into fill portions or sections disposed in the heat exchange modules 120, 124. Further details regarding the travel of liquid from the hot water basins 138, 140 and through the modular heat transfer tower 100 is described in reference to FIG. 4, below.

Figure 2:
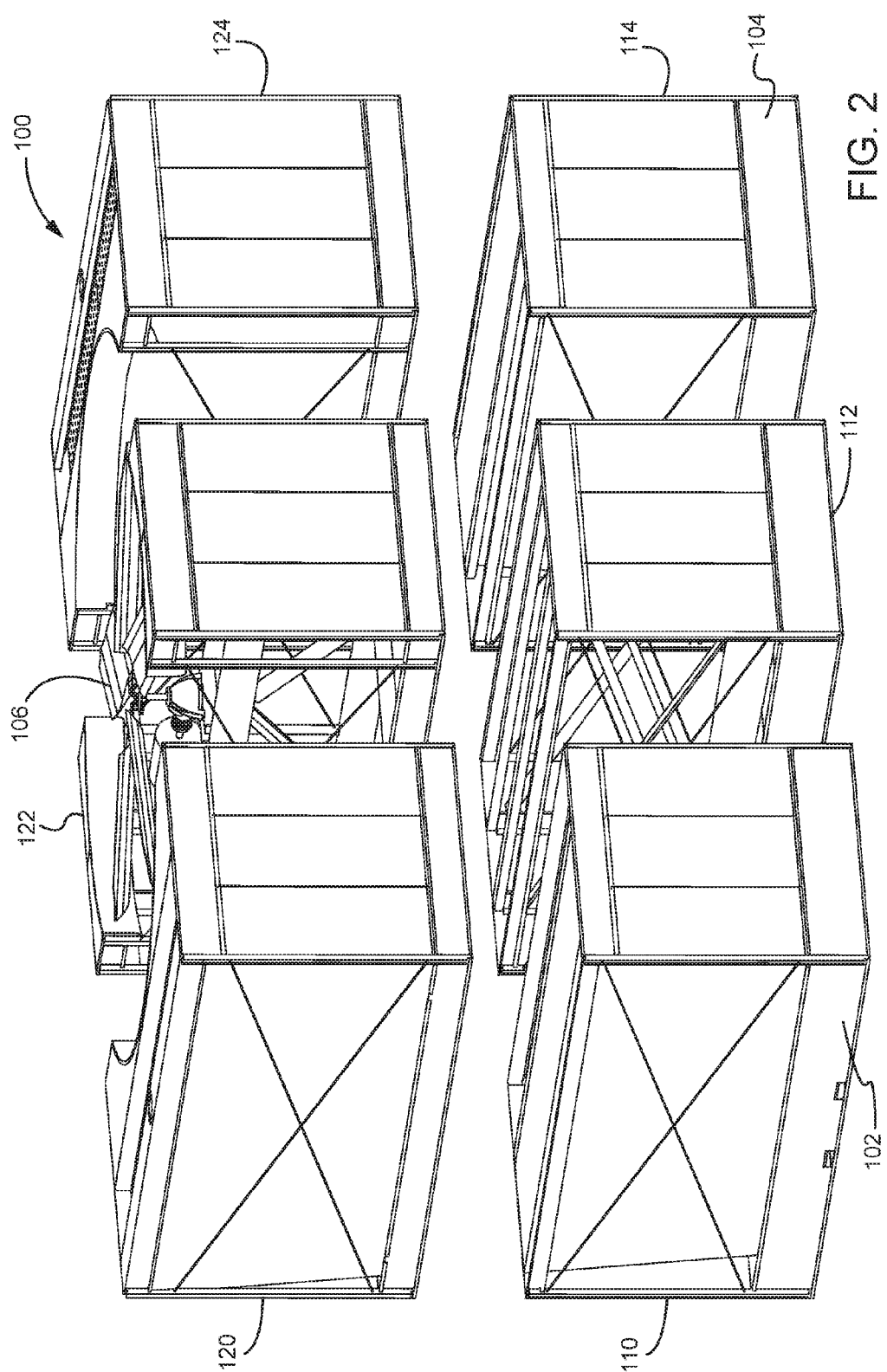
FIG. 2 is an exploded view of the modular heat exchange tower depicted in FIG. 1 showing a plurality of modular components of the modular heat exchange tower in accordance with an embodiment of the present disclosure.

Referring now to FIG. 2, an exploded view of the modular heat transfer tower 100 is depicted. This exploded view shows in greater detail each of the six (6) modular components—the collection basin modules 110, 114; the plenum module 112; the heat exchange modules 120, 124; and the fan module 122—of the modular heat transfer tower 100. This exploded view shows that the first water basin 102 is disposed in the first collection basin module 110, and the second water basin 104 is disposed in the second collection basin module 114. The exploded view also shows that the fan 106 is disposed in the heat exchange modules 120, 124 and the fan module 122.

Referring now to FIG. 3, a top view of the modular heat transfer tower 100 is depicted. As depicted in FIG. 3, the heat exchange modules 120, 124 and the fan module 122 are disposed adjacent to one another—specifically, the fan module 122 is disposed between the first heat exchange module 120 and the second heat exchange module 124. Further, as shown in FIG. 3, the first hot water basin 138 extends along a length of the first heat exchange module 120, and the second hot water basin 140 extends along a length of the second heat exchange module 124.

FIG. 4 depicts a cross-sectional view of the modular heat transfer tower 100 along the line A-A and in the direction of the arrows depicted in FIG. 3. As shown in this cross-sectional view, each of the collection basin modules 110, 114 and the heat exchange modules 120, 124 include a fill portion. Specifically, the first collection basin module 110 includes a first fill portion 130. The second collection basin module 114 includes a second fill portion 132. The first heat exchange module 120 includes a third fill portion 134. And the second heat exchange module 124 includes a fourth fill portion 136. The fill portions 130, 134 may form a first heat exchange section, and the fill portions 132, 136 may form a second heat exchange section.

While the heat exchange modules 120, 124 are described as containing fill, one of ordinary skill in the art would appreciate that the heat exchange modules 120, 124 may comprise other heat exchange means, such as, for example, closed circuit coils or tube bundles.

During operation, hot water placed in the hot water basins 138, 140 may travel through the modular heat transfer tower 100 in the longitudinal direction towards the cold water basins 102, 104. Specifically, hot water that is placed in the first hot water basin 138 may travel through the openings 108 in the first hot water basin 138 and into the third fill portion 134 and then into the first fill portion 130. In other words, the first fill portion 130 and the third fill portion 134 form a continuous path for the hot water which is placed in the first hot water basin 138 to travel along and into the first cold water basin 102. As the hot water travels along the length of the first fill portion 130 and the third fill portion 134 or, the first fill section, it is cooled by cooler ambient air that travels horizontally (or substantially horizontally) into the first collection basin module 110 and the first heat exchange module 120 or, specifically, the first fill portion 130 and the third fill portion 134 disposed in the first collection basin module 110 and the first heat exchange module 120, respectively, from outside of the modular heat transfer tower 100. Thus, when the hot water reaches the first cold water basin 102, it has been cooled and is therefore received as cold water in the first cold water basin 102. The ambient air, which has been used to cool the hot water, is drawn into the plenum module 112 and the fan module 122 by the fan 106 and upwards and out of the modular heat transfer tower 100.

Similarly, hot water placed in the second hot water basin 140 may travel through the openings 108 in the second hot water basin 140 and into the fourth fill portion 136 and the second fill portion 132. The hot water that is placed in the second hot water basin 140 is separate from the hot water that is placed in the first hot water basin 138. Like the first fill portion 130 and the third fill portion 134, the second fill portion 132 and the fourth fill portion 136 form a continuous path for the hot water which is placed in the second hot water basin 140 to travel along and into the second cold water basin 104. Much in the same way that the hot water placed in the first water basin 138 is cooled, the water placed in the second hot water basin 140 is cooled using cooler ambient air which enters the second fill portion 132 and the fourth fill portion 136 from the sides of the second collection basin module 114 and the second heat exchange module 124.

The operation of cooling the hot water that is placed in the hot water basins 138, 140 that is described in that of a cross-flow cooling tower. Thus, the fill portions 130, 132, 134, 136 may comprise cross-flow fill.

To assemble the modular heat transfer tower 100 depicted in FIG. 1, the bottom layer of modules may be positioned, and then the top layer of modules may be positioned on top of the bottom layer of modules. For example, the first collection basin module 110 may be positioned, and the second collection basin module 114 may be positioned laterally spaced apart from the first collection basin module 110. The plenum module 112 may be positioned in the space between the first collection basin module 110 and the second collection basin module 114. The plenum module may be positioned prior to the fill modules. The first heat exchange module 120 may be positioned on top of (or vertically adjacent to) the first collection basin module 110, and the second heat exchange module 124 may be positioned on top of (or vertically adjacent to) the second collection basin module 114. The first heat exchange module 120 and the second heat exchange module 124 may be placed such that the fill portions 134, 136 line up with the fill portions 130, 132, respectively, such that the fill portion 130 and the fill portion 134 create a continuous fill section and the fill portion 132 and the fill portion 136 create a continuous fill section. The fan module 122 may be positioned on top of the plenum module 112 in between the first heat exchange module 120 and the second heat exchange module 124. The fan module may be positioned prior to the fill modules.

The modular heat transfer tower 100 depicted in FIG. 1 comprises a single cell. Nonetheless, one of ordinary skill in the art would appreciate that the module heat transfer tower 100 may comprise more than one cell. Importantly though, as depicted in FIG. 1, each cell of the modular heat transfer tower 100 would comprise at least two (2) water basins (e.g., water basins 102, 104), and each cell can be divided into six (6) modules.

Each of the six (6) modules of the modular heat transfer tower 100 may be assembled in a factory and transported to a job site for final assembly in the modular heat transfer tower 100. In particular, the first collection basin module 110 may be assembled in a factory including the first water basin 102, and the second collection basin module 114 may be assembled in a factory including the second water basin 104. Because both the first water basin 102 and the second water basin 104 are assembled into modules at the factory, no water sealing would need to be done at the job site where the modular heat transfer tower 100 is assembled. The fan 106 and the fan cylinder (not labeled) may be assembled at the job site.

Figure 5:
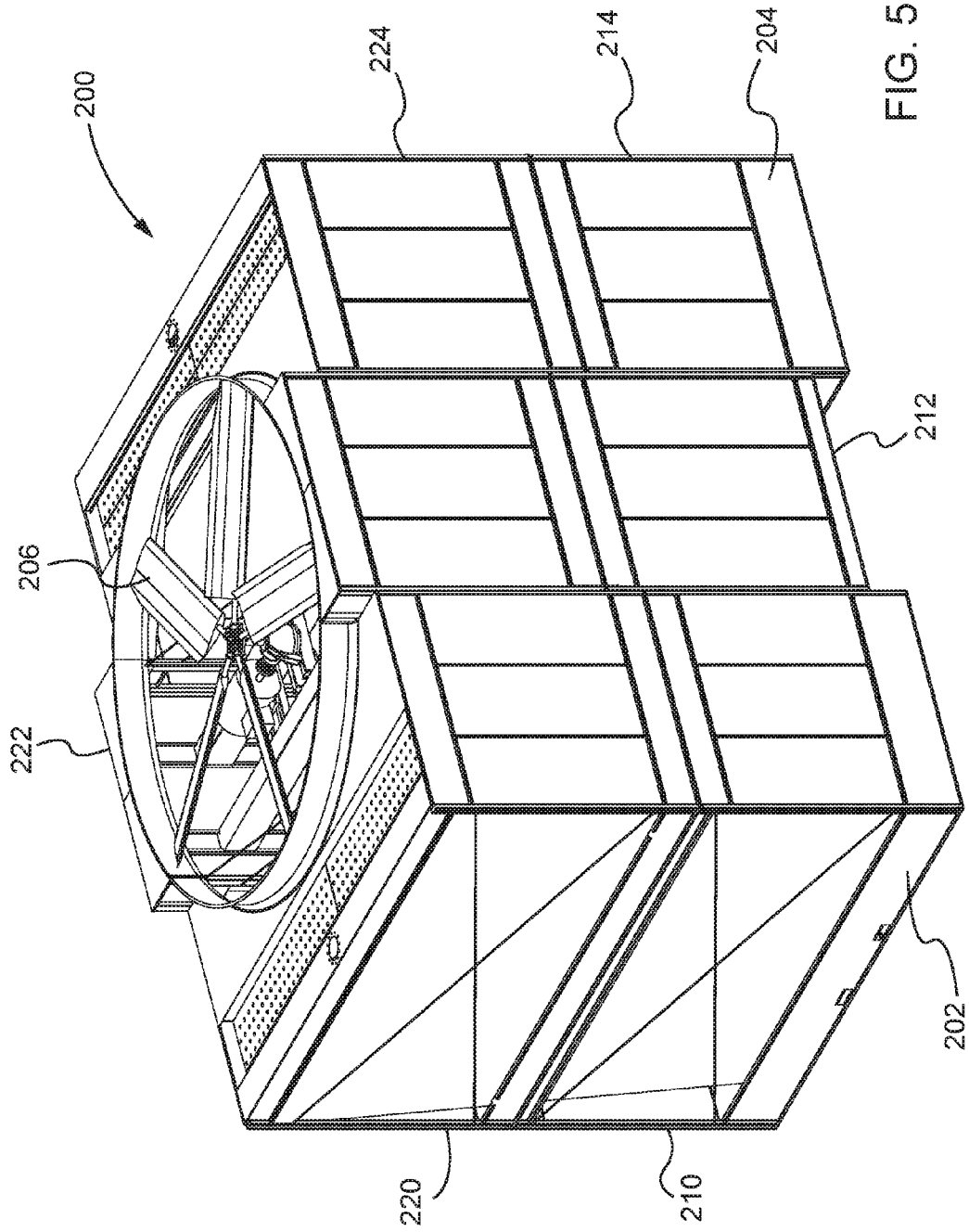
FIG. 5 is a perspective view of a second exemplary modular heat exchange tower in accordance with an embodiment of the present disclosure.

Referring now to FIG. 5, a second exemplary modular heat transfer tower 200 is depicted. The modular heat transfer tower 200 may comprise six (6) modules including: a first collection basin module 210, a plenum module 212, a second collection basin module 214, a first heat exchange module 220, a fan module 222, and a second heat exchange module 224. The modular heat transfer tower 200 may also comprise a first water basin 202 and a second water basin 204. The modular heat transfer tower 200 may also comprise a fan 206 and hot water basins 238, 240 with through-holes 208 (depicted in FIG. 6).

Figure 7:
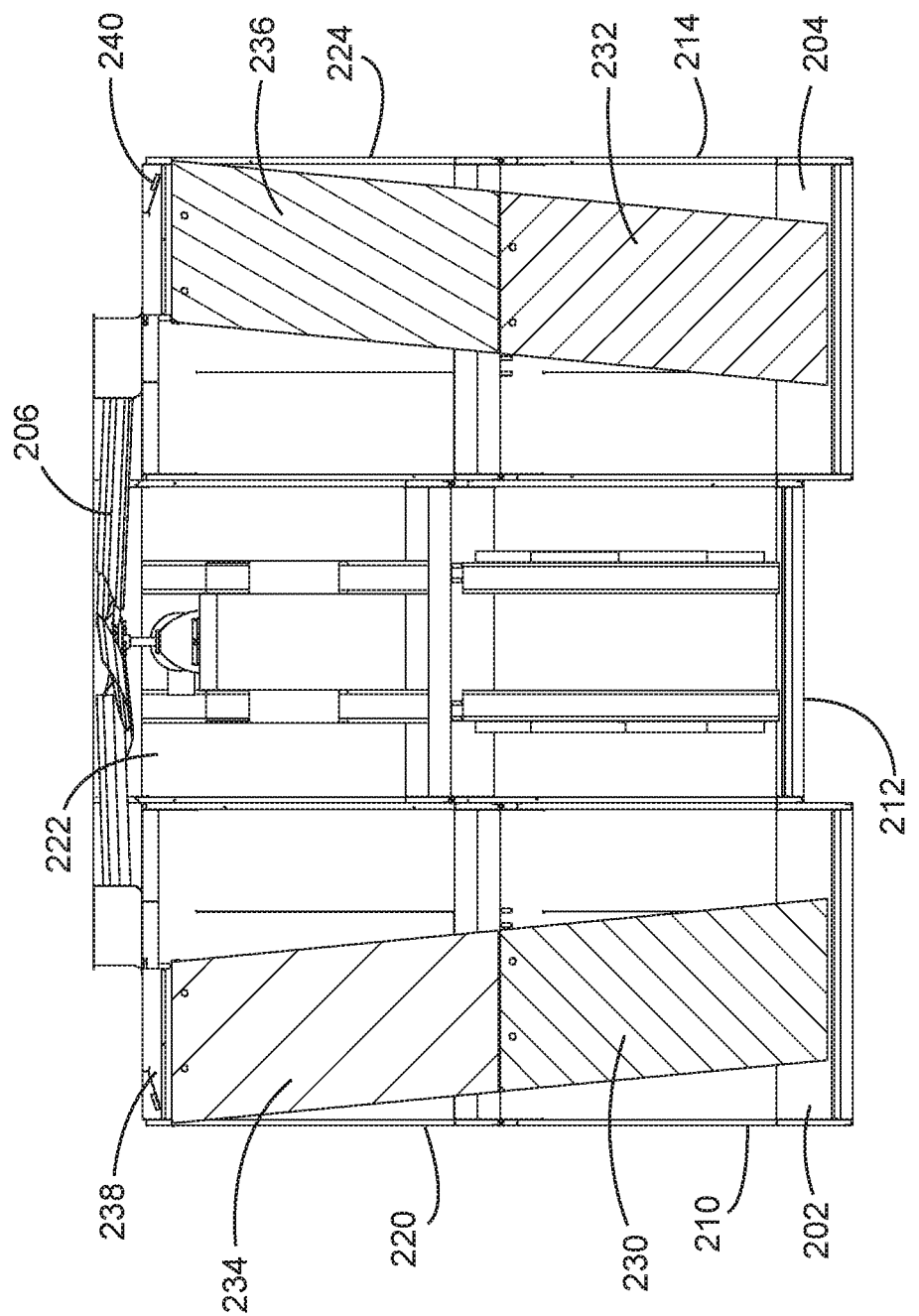
FIG. 7 is a cross-sectional view of the modular heat exchange tower depicted in FIG. 5 showing a plurality of heat exchange portions in accordance with an embodiment of the present disclosure.

The first collection basin module 210 may comprise the first water basin 202 and a fill portion 230 (depicted in FIG. 7). Or, stated differently, the first water basin 202 and the fill portion 230 may be disposed in the first collection basin module 210. The second collection basin module 214 may comprise the second water basin 204 and a fill portion 232 (depicted in FIG. 7). The first heat exchange module 220 may comprise a fill portion 234, and the second heat exchange module 224 may comprise a fill portion 236.

The modular heat transfer tower 200 is similar to the modular heat transfer tower 100 in all respects except that the plenum module 212 and the fan module 222 are positioned slightly offset in the longitudinal direction from the collection basin modules 210, 220 and the heat exchange modules 214, 224.

Figure 6:
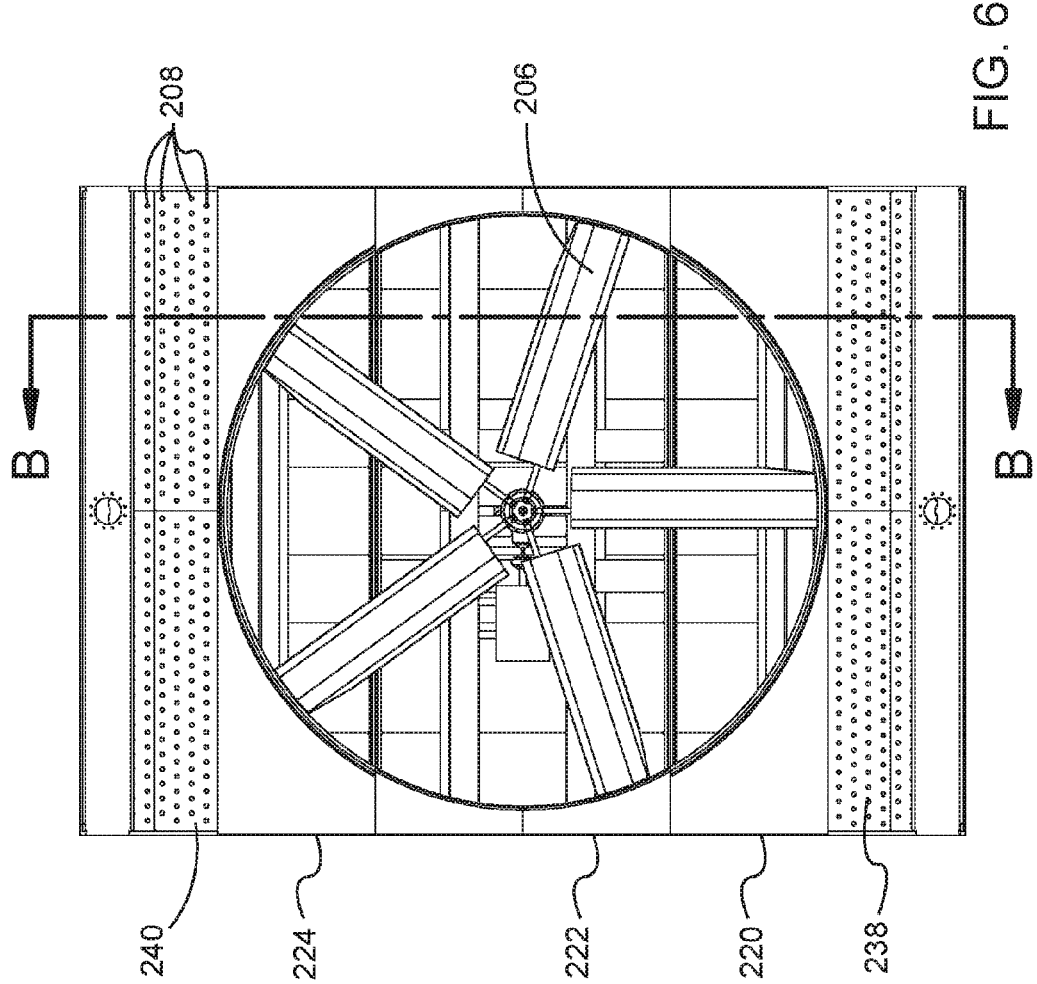
FIG. 6 is a top view of the modular heat exchange tower depicted in FIG. 5 showing an air current generator in accordance with an embodiment of the present disclosure.

FIG. 7 depicts a cross-sectional view of the modular heat transfer tower 200 along the line B-B in the direction depicted in FIG. 6. As shown in FIG. 7, the plenum module 212 and the fan module 222 are slightly raised in the longitudinal direction as compared to the collection basin modules 210, 220 and the heat exchange modules 214, 224. Accordingly, the fan 206 may be disposed entirely above the heat exchange modules 214, 224 and the fan module 222. Such an elevated placement of the fan 206 may create a more efficient flow of air through the modular heat transfer tower 200 as compared to the modular heat transfer tower 100. Moreover, the plenum module 212 may be positioned such that the bottom of the plenum module 212 does not contact a surface on which the collection basin modules 210, 220 are placed. In other words, the plenum module 212 may be elevated in relation to the water basins 202, 204 (disposed in bottom portions of the collection basin modules 210, 220, respectively). By elevating the plenum module, access under the tower is enhanced and can provide better access to piping.

Figure 8:
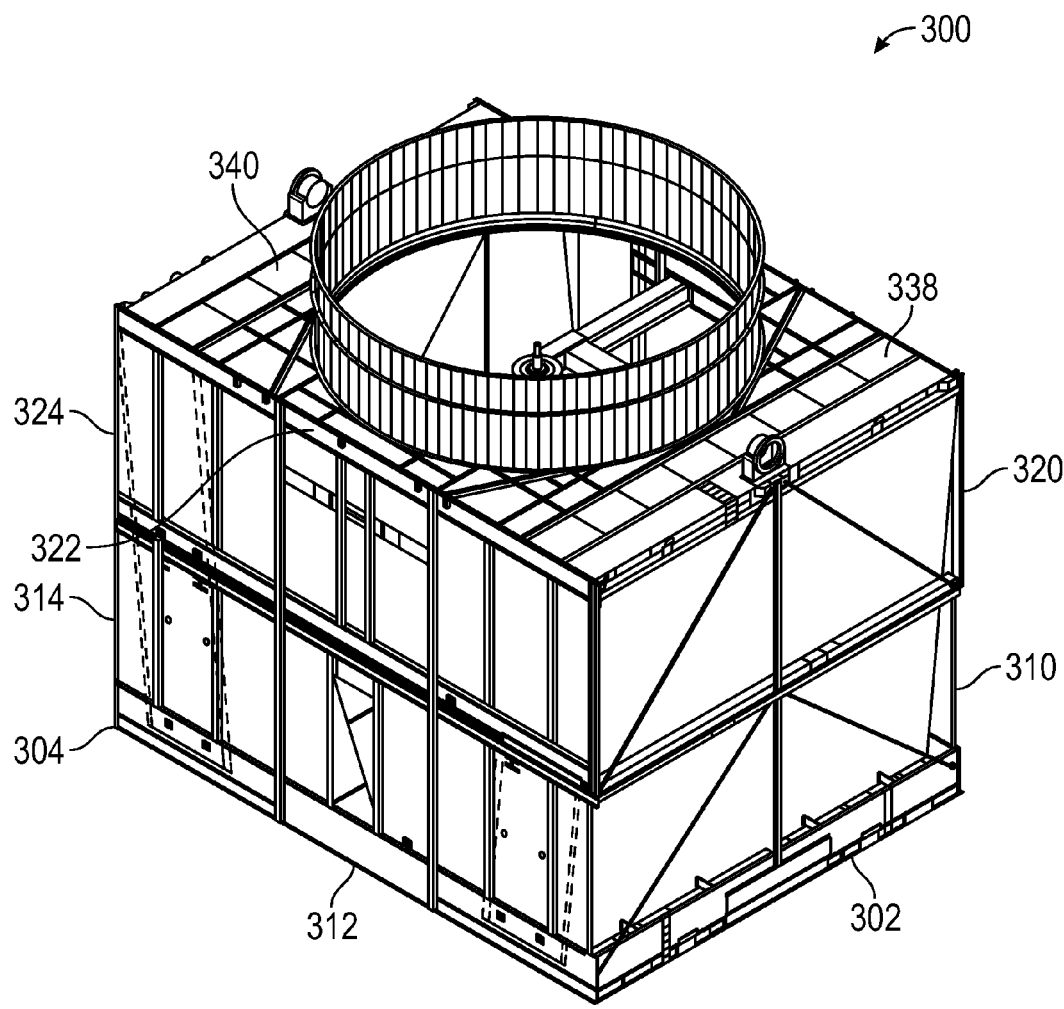
FIG. 8 is an isometric view of a modular heat exchange tower in accordance with an embodiment of the present invention.

Turning now to FIG. 8, another exemplary modular heat transfer tower 300 is depicted, similar to that described previously in connection with FIG. 1. The modular heat transfer tower 300 may be, for example, a cooling tower or the like. The modular heat transfer tower 300 comprises six (6) modules including: a first collection basin module 310, a plenum module 312, a second collection basin module 314, a first heat exchange module 320, a fan module 322, and a second heat exchange module 324. The modular heat transfer tower 300 also includes a first water basin 302 and a second water basin 304. Water basins 302, 304 may be examples of the first basin and the second basin, as set forth in the claims.

The first water basin 302 may be disposed in the first collection basin module 310, and the second water basin 304 may be disposed in the second collection basin module 314. More specifically, the first water basin 302 is disposed at a bottom portion of the first collection basin module 310, and the second water basin 304 is disposed at a bottom portion of the second collection basin module 314. The first collection basin module 310 and the second collection basin module 314 are laterally spaced apart from one another, and thus the first water basin 302 and the second water basin 304 are laterally spaced apart from one another.

As depicted in FIG. 8, the water basins 302, 304 are separately sealed from each other. The water basins 302, 304 may be sealed in a factory prior to being transported to a job site for final assembly in the modular heat transfer tower 300. Alternatively, the water basins 302, 304 may be partially constructed in a factory and sealed at a job site. Furthermore, while the water basins 302, 304 are illustrated as separately sealed units in FIG. 8, one of ordinary skill in the art would appreciate that the water basins 302, 304 need not be separately sealed but can be in fluid communication with one another such that they form a common basin.

As depicted in FIG. 8, the plenum module 312 is disposed in the space between the first collection basin module 310 and the second collection basin module 314. Together, the first collection basin module 310, the plenum module 312, and the second collection basin module 314, form a first layer 301—specifically, a bottom layer or base—of the modular heat transfer tower 300.

In a separate layer—specifically, a top layer—the first heat exchange module 320, the fan module 322, and the second heat exchange module 324 may be disposed. The first heat exchange module 320 may be disposed above the first collection basin module 310 or, in other words, the first heat exchange module 320 may be disposed vertically adjacent to the first collection basin module 310. And the second heat exchange module 324 may be disposed above the second collection basin module 314 or, in other words, the second heat exchange module 324 may be disposed vertically adjacent to the second collection basin module 314. The heat exchange modules 320, 324 may be disposed vertically adjacent to the collection basin modules 310, 314 in a longitudinal direction. The collection basin modules 310, 314 and the heat exchange modules 320, 324 may have openings along their exterior sides for allowing air from outside of the modular heat transfer tower 300 to travel into the modular heat transfer tower 300 or, specifically, to travel into the collection basin modules 310, 314 and the heat exchange modules 320, 324.

The fan module 322 may be disposed vertically adjacent to the plenum module 312. Both the plenum module 312 and the fan module 322 may comprise hollow chambers for receiving air travelling through the collection basin modules 310, 314 and the heat exchange modules 320, 324 from outside of the modular heat transfer tower 300. The fan module 322 may also include a supporting attachment for holding a fan cylinder and a fan (not pictured). The fan may be an example of an air current generator, such as a fan or impeller. The fan 306 pulls the air that travels through the collection basin modules 310, 314 and the heat exchange modules 320, 324 from the outside atmosphere into the plenum module 312 and the fan module 322 and back out into the atmosphere.

Additionally, the modular heat transfer tower 300 may comprise a first hot water basin 338 and a second hot water basin 340. The first hot water basin 338 may be disposed in the first heat exchange module 320, and the second hot water basin 340 may be disposed in the second heat exchange module 324. More specifically, the first hot water basin 338 may be disposed in a top portion of the first heat exchange module 320, and the second hot water basin 340 may be disposed in a top portion of the second heat exchange module 324. Each of the first hot water basin 338 and the second hot water basin 340 may comprise a plurality of openings or apertures. The openings are configured to allow a liquid that is placed in the hot water basins 338,340 to travel out of the hot water basins 338,340 and into lower regions of the modular heat transfer tower 300 typically via nozzles—specifically, into fill portions or sections disposed in the heat exchange modules 320, 324.

Figure 9:
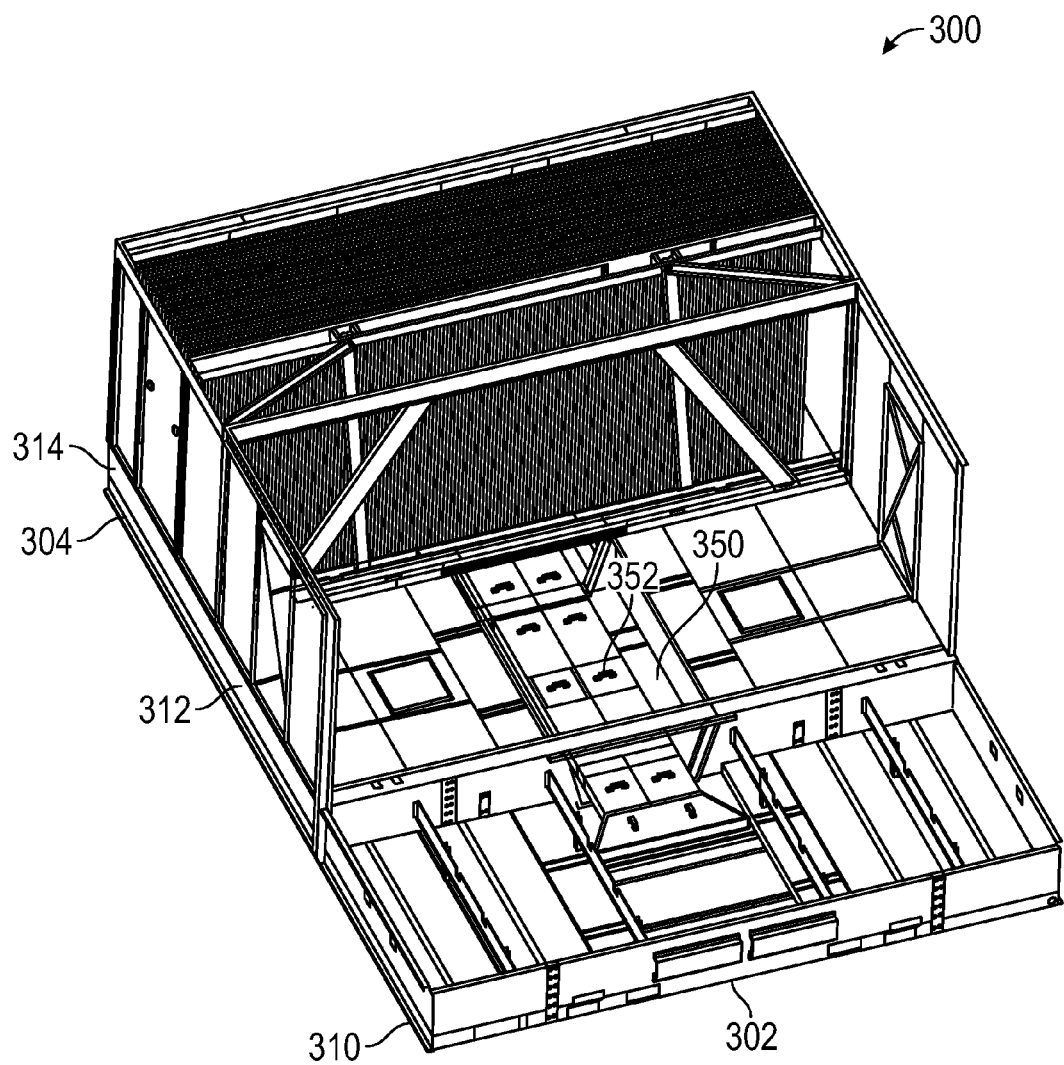
FIG. 9 is a partial cut away view of the modular heat exchange tower depicted in FIG. 8 illustrating the internal cooling liquid basins.
Figure 10:
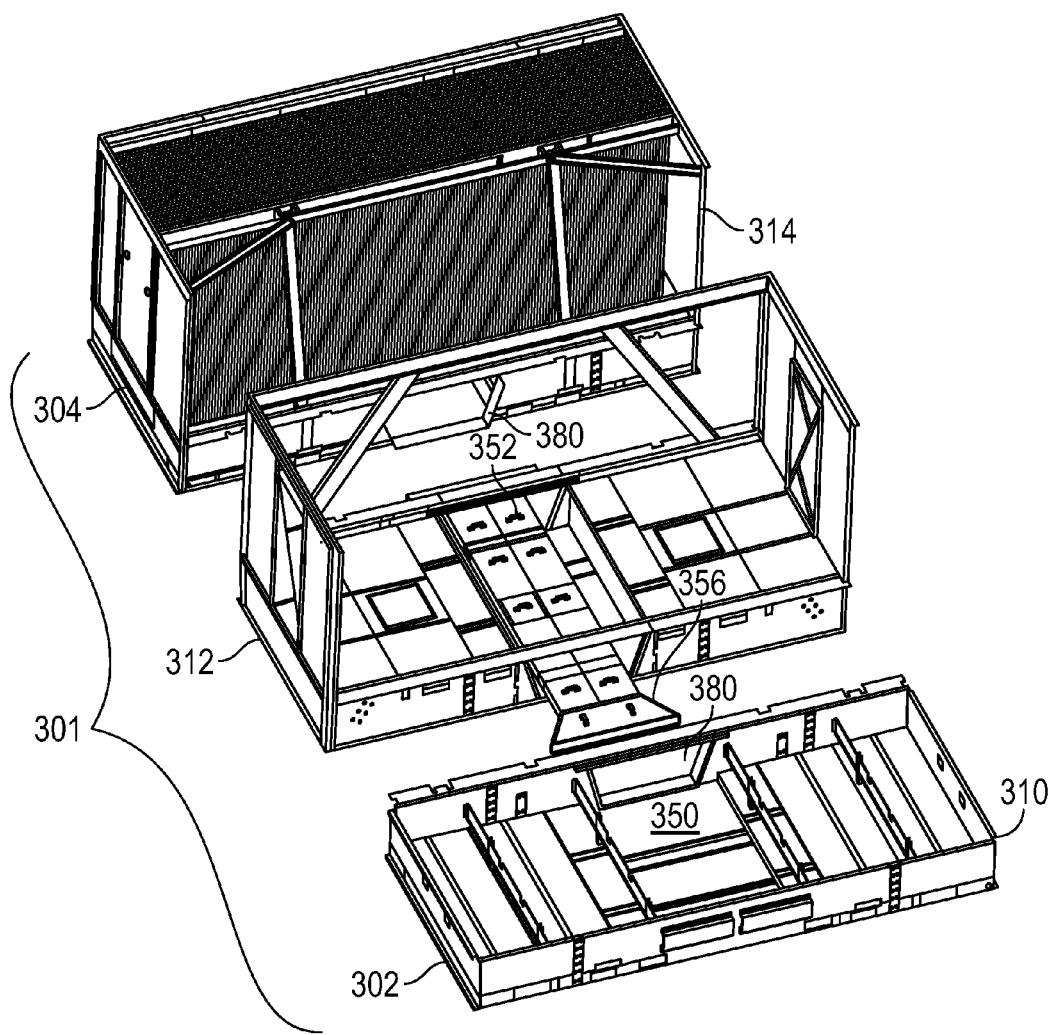
FIG. 10 is a partial exploded view of the modular heat exchange tower illustrated in FIGS. 8 and 9.

Turning now to FIGS. 9 and 10, it is standard practice to have cold water basins without an outlet to be in fluid communication with a cold water basin having an outlet via a flume. In such designs, the water in the basin without the outlet must pass through the flume to access the outlet which is typically accomplished via gravity. In order for gravity to push water through the flume, the water level in the basin without an outlet, must increase in depth. This can typically increase the operating weight of the tower and/or increase the water level, flooding the bottom of the fill, resulting in a loss in performance. Accordingly, this is to be avoided if possible.

As illustrated in FIGS. 9 and 10, the modular heat exchange tower 300 has a basin depressed portion 350 disposed within the heat exchange tower 300. The basin depressed portion serves to provide higher head (water depth) over the water outlet without requiring the respective bottom modules basins to carry that depth of water over their entire plan area. More specifically, the heat exchange tower 300 includes a suction hood 352 that may extend from the plenum module 312, to the adjacent collection basin modules 310,314. As more clearly illustrated in FIGS. 11 and 12, the hood 352 is positioned or oriented over a outlet 354 and extends therefrom to the adjacent collection basin modules 310,314. Specifically, the suction hood extends from the basin with an outlet, i.e., the plenum module 312 outlet, through the flume opening into the basins without an outlet, i.e., the heat collection basin modules 310,314 wherein it pulls water directly from the basin with no outlet to the outlet, thus eliminating potential flume limitations.

As previously discussed, each module contains a depressed floor section. The depressed sections of the outer modules, are connected to the depressed section of the middle module with a flume. This allows fluid to pass from the outer modules to the middle module, where the fluid is passed out of the cooling tower. The flume must be fluid tight, and not allow fluid to pass outside of tower. Also as described, a trapezoidal cutout is placed in the depressed sections of the basin sides to allow fluid to pass between basins. The perimeter of the flume cutout is framed with members utilized to seal and connect the adjacent flumes.

In a preferred embodiment of the present invention, the bottom of the cutout may be above or at the same level as the depressed section floor. By extending the cutout down to the same level as the depressed section floor, more fluid is allowed to pass through the flume opening for a given operating fluid depth. This can result in a lower operating fluid depth, which in turn reduces the operating weight of the tower.

Figure 11:
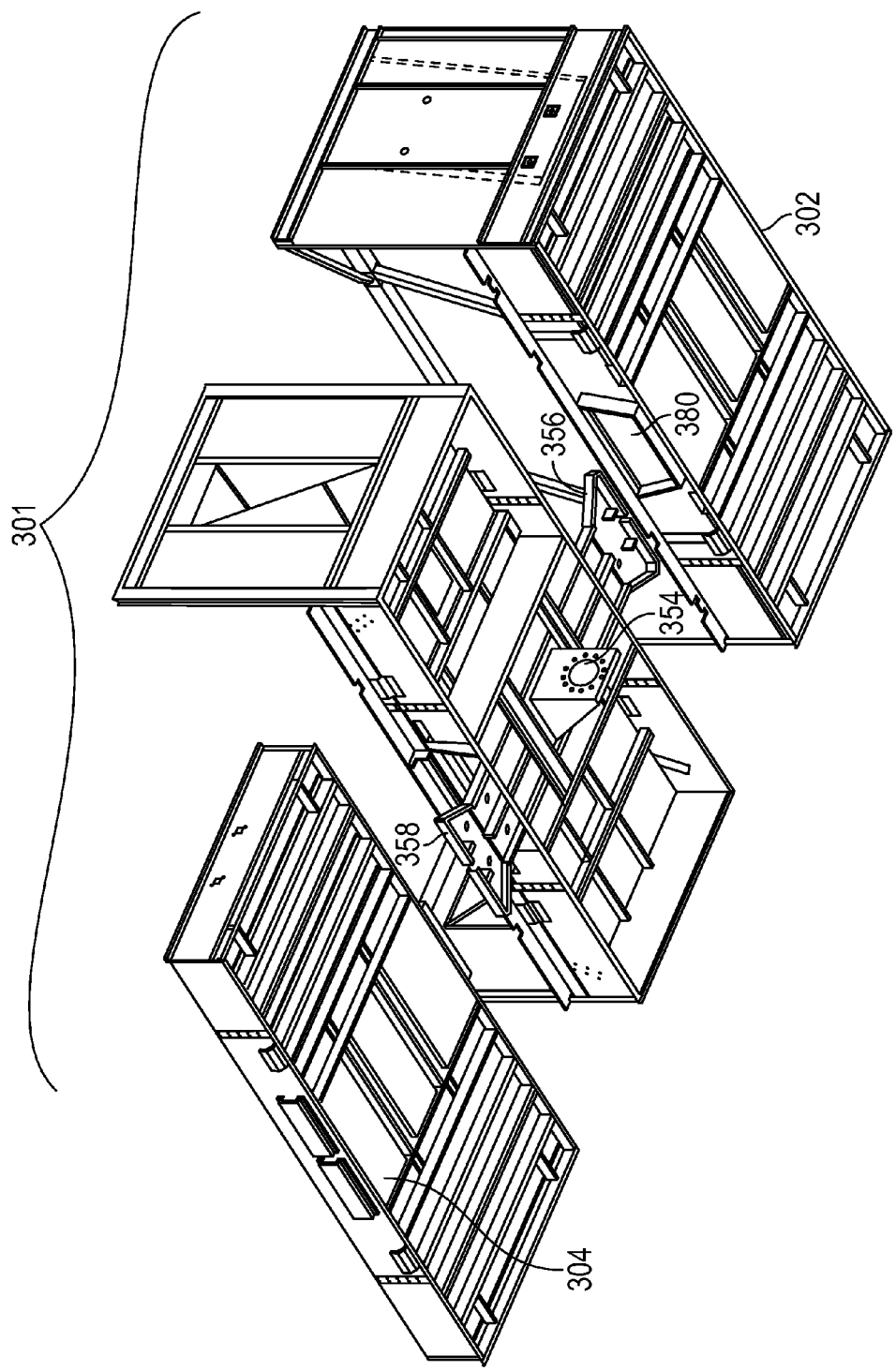
FIG. 11 is another partial exploded view illustrating the cooling liquid basins in accordance with an embodiment of the present invention.

As illustrated in the figures, in one preferred embodiment the suction hood 352 is constructed from a series of individual components or parts that may vary in size and number depending upon the application and the plan of the modular tower. Also as illustrated in FIGS. 9-11, suction hood 352 has a first inlet end 356 and a second inlet end 358. The first inlet 356 extends into the basin 302 while the second inlet 358 extends into the second basin 304. In one preferred embodiment of the present invention, the first and second inlets 356, 358 preferably have a trapezoidal configuration or geometry as illustrated, however alternative embodiments of the present invention may have geometries that vary, for example, rectangular, polygonal, circular or curvilinear.

As previously described, the suction hood 352 extend from a module with the outlet, e.g. the plenum module, through the flume opening in the basin side 380 and into the basin without an outlet, e.g., the basins 302 and 304. Accordingly, during operation, the suction hood 352 pulls water directly from the basins with no outlet to the outlet. Moreover, the flow area into the hood may be from the sides, the sides and end, or just the end as illustrated. The suction hood can extend into as many as 4 different basins that do not have an outlet. Also, the area between the suction hood and the sides of the flume allows water to pass between the suction hood and the flume to equalize the water in the basins. A separate equalizer is therefore not required.

Figure 12:
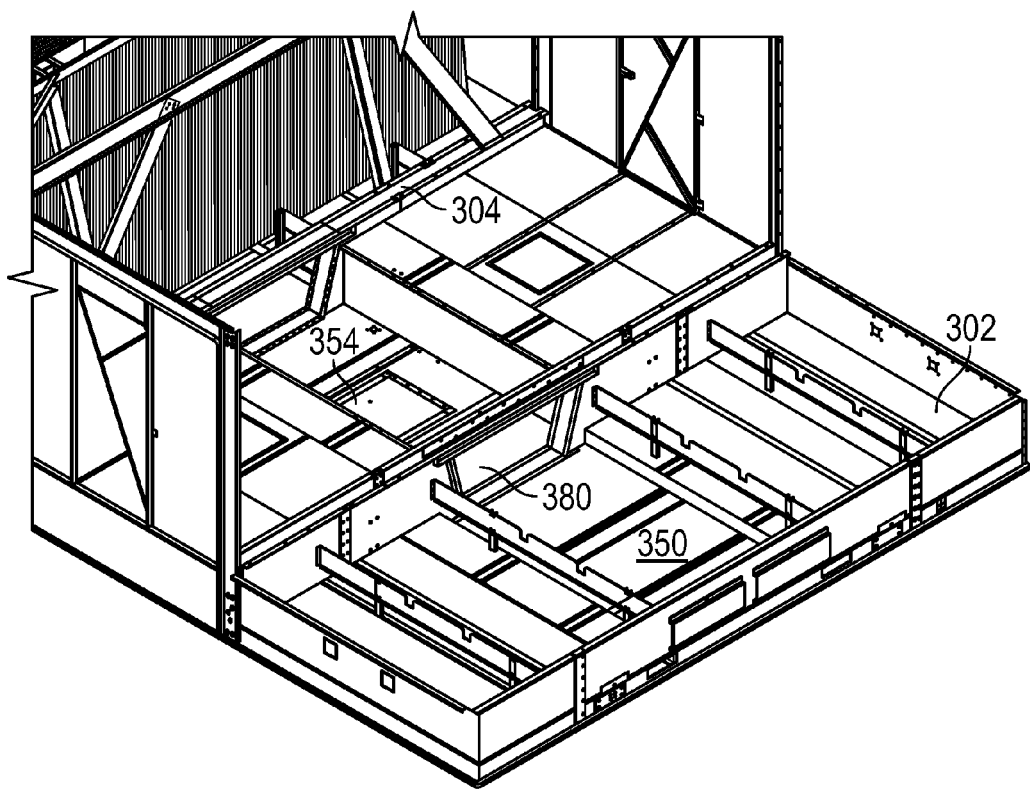
FIG. 12 is a partial, internal view of the modular heat exchange tower illustrating the liquid flow flume in accordance with an embodiment with the present invention.
Figure 13:
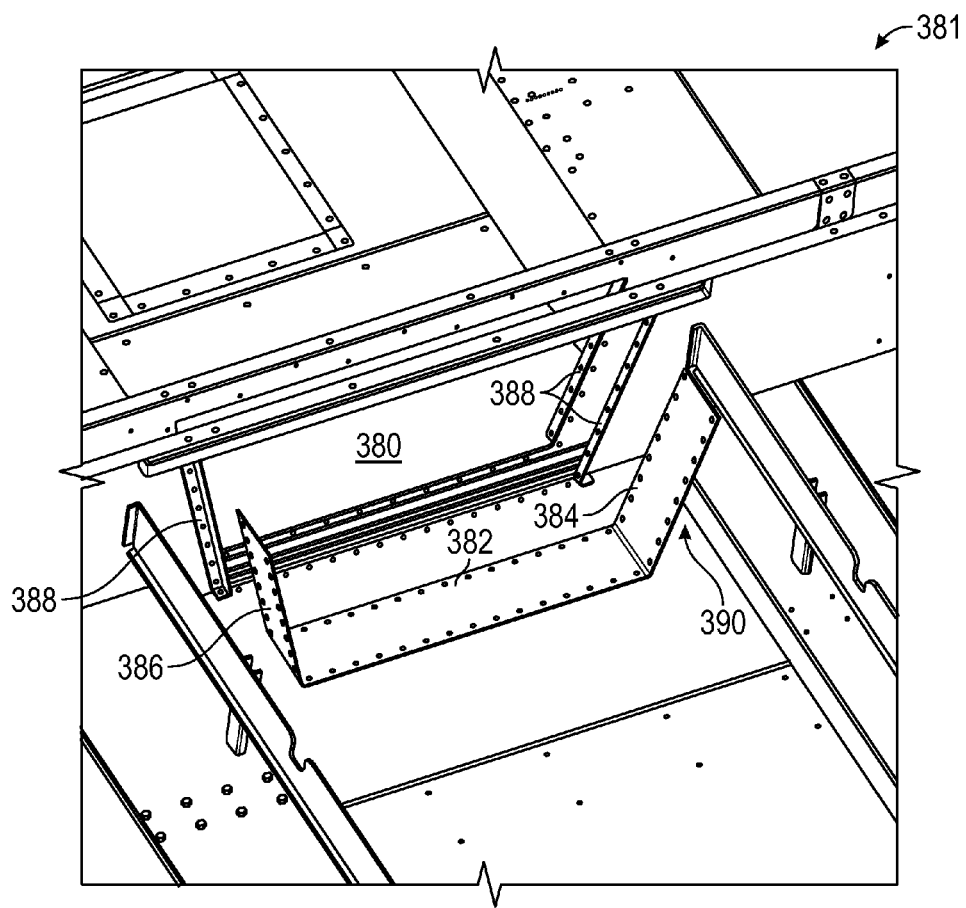
FIG. 13 is an isometric view of a flow path connection of the flume in accordance with an embodiment of the present invention.
Figure 14:
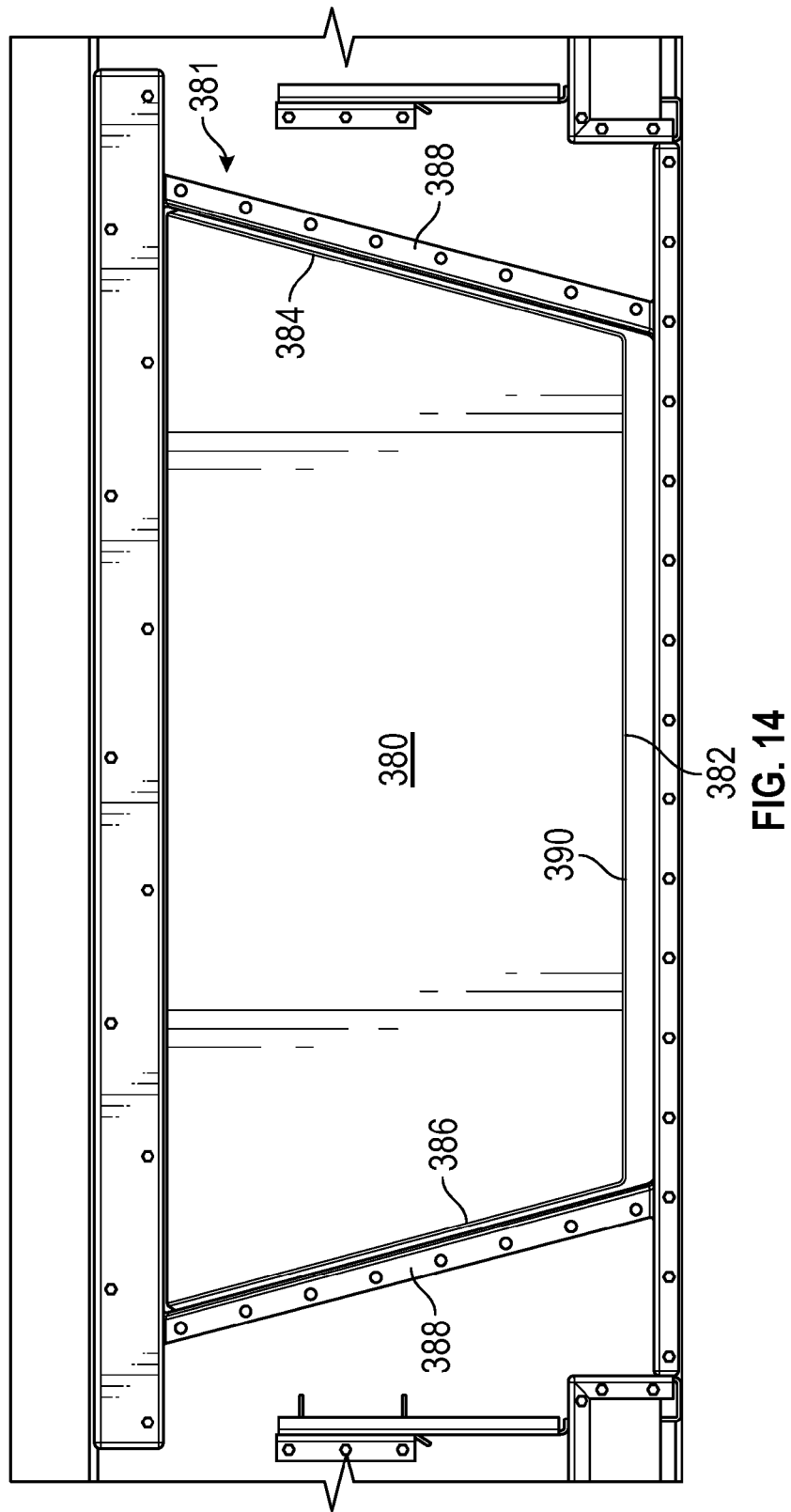
FIG. 14 is a detailed view of the flow path connection depicted in FIG. 13.

Turning now to FIGS. 12-14, a flow path connection, generally designated 381 that connects adjacent to modules is pictured. As illustrated the flow path connection 381 is trapezoidal in geometry to compliment the flume design. As previously discussed, the flume has primarily two purposes: (1) To transfer water from the heat exchange basins 302, 304 to the outlet 354; and (2) To equalize the liquid levels between the basins.

As illustrated in FIG. 13, the new flume design and flow opening 380 are trapezoidal in geometry. Water basin 302 and plenum module 312 are connected at flow opening 380 via flow connection 381 wherein said flow connection comprises angles that attach to the basins sides 382 having a pair of side walls 384, 386 extending therefrom. Also, each module has a flange 388 to which the connection 381 attaches. Each sidewall 384, 386 is sloped at an angle. In one preferred embodiment, the base 382 and opposing sidewalls 384, 386 are a single, contiguous plate 390 wherein the plate is bent or creased to form the base and respective sides.

To effect a water tight connection, sealer is first applied to the mating surfaces of plate 390 of the respective modules including flanges 388. During insertion or assembly, the sidewalls 384, 386 of the plate 390 are pulled inward. The inflexion or "pulling inward" of the sidewalls 384, 386 is to prevent the smearing of sealer on the side flanges 388 of the respective modules. As illustrated in FIG. 13, holes in the bottom of the modules are aligned with holes in the plate (both on the base and respective sidewalls). Next, the bottom or base 382 is pressed into the sealer on the bottom of the modules. Bolts (not pictured) are then installed along the bottom sealingly attaching the base 382. The sidewalls 384, 386 are then pressed into the sealer where fasteners are similarly inserted, and when tightened seal the attachments to the sidewalls.

More specifically, as previously described, in one embodiment encompassed by the present invention, preferably a one piece trapezoidal flume is used to connect one basin to the other. Next, sealer is applied to the members framing the cutouts in the basin sides. The height of the trapezoidal flume insert is less than the height of the cutout in the basin side. This allows the flume insert to be raised up above the sealer as it is placed over the members framing the cut out. The flume insert is then lowered down into position and fastened to the frame. As the fasteners are tightened the sealer compresses and forms a fluid tight seal. The shape of the cutout allows for the flume to be inserted and lowered down onto the sealer. By lowering the insert, the sealer does not get wiped away or disturbed, thus providing a superior seal.

As described above, the flume design in accordance with an embodiment of the present invention, has sloping or angled sidewalls 384, 386 that allow the flume section to be set in place, in a manner that compresses the sealer (or gasket) instead of smearing the sealant and causing potential leakage. The angle of the sidewalls 384, 386 are fabricated or angled such that they are more upright than the cutout in the basin side and as described, during assembly or insertion, the bottom is attached first. The sidewalls are then gradually pulled into place, starting from the bottom and working upward.

The preferred embodiment trapezoidal shape is not the only shape that can accomplish the desired connection and effective seal. For example, the shape could be V-shaped or semicircular. The connection plate ends are again pulled inward prior to insertion to prevent contact of the plate surfaces from smearing the sealer. The bottom of the plate is positioned and the pressed into the sealer and fastened. Progressively the rest of the plate is positioned and fastened until the entire plate is positioned and fastened. In the case of the V-shaped embodiments, the bottom or base may be an apex where the connection plates meet or join. In such embodiments, the apex is pressed into the sealer first, prior to the sides being pressed into position.

This above-described shape allows for the flow connection 381 to be a single piece in the water retaining areas verses designs that employ multiple components, and thus, multiple seams below the water level which may lead to leakage. In alternative embodiments the flow connection 381 may (but is not required to) extend all the way to the floor, reducing water levels in the basin, and increasing flow rate. A cover may be used to close off the top of the flume.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example an induced draft heat exchanger has been illustrated but a forced draft design can be adapted to gain the same benefits and, accordingly, all suitable modifications and equivalents may be resorted to that fall within the scope of the invention. As noted above, another example is replacing one or more of the modules containing fill with modules that may include closed circuit coils or tube bundles for cooling and/or condensing fluids. In yet another example one or more modules may include fill and closed circuit coils, tube bundles, or splash bars.

Another construction in the spirit of the scope of this invention is to add more modules in plan view. For example a tower of approximately twice the cooling capacity could be comprised of twice as many collection basin modules, twice as many heat exchange modules and four times as many plenum and fan modules. More than twice as many plenum and fan modules may desirable to place a larger diameter fan. Furthermore, an odd number of plenum and fan modules may desirable to have a central module that contains the fan mechanical equipment, particularly the motor, gearbox, and fan hub.

Yet another construction is spirit of the scope of this invention is to add more modules vertically. For example additional modules with heat exchangers could be placed between the collection modules and the heat exchange modules as previously described. Additional modules between the plenum modules and the fan modules can be placed to compliment taller overall heat exchanger assemblies.

Also, in the spirit of the scope of the invention is a construction using fewer modules. For example the plenum module or portions of the plenum module can be incorporated in one or both collection basin modules. Likewise, the fan module or portions of the fan module can be incorporated in one or both of the heat exchange modules.

Another construction in the spirit of the scope of the invention using fewer modules may be a one module high tower with two collection basin modules. The plenum and fan may also reside in those same collection basin modules but may also reside in a separate single module. In this case, the first heat exchange section and the second heat exchange sections are fully contained in the respective collection basin modules.

What is claimed is:

1. A modular heat exchange tower that extends vertically along a longitudinal axis, comprising:
   a first module comprising a first basin disposed therein;
   a second module that defines a plenum, wherein said second module comprises a outlet;
   a first flume in fluid communication with said outlet, wherein said flume extends from said second module to said first module,
   wherein said first flume comprises:
   a first linear base wall;
   a first linear side wall that extends from said first linear base wall at an angle; and
   a second linear side wall that opposes said first linear side wall that extends at an angle from said first linear base wall, wherein said first flume further comprises a first top linear wall that extends between said first and second linear sidewalls generally parallel to the first linear base wall;
   a first heat exchange section; and
   an air current generator.

2. The modular heat exchange tower according to claim 1, further comprising a third module having a second basin disposed therein.

3. The modular heat exchange tower according to claim 1, wherein said first flume is trapezoidal in geometry.

4. The modular heat exchange tower according to claim 2, further, comprising:
   a second flume in fluid communication with said outlet, wherein said second flume extends from said third module to said second module, wherein the second flume comprises:
   a second linear base wall;
   a third linear side wall that extends from said second linear base wall at an angle; and
   a fourth linear side wall that opposes said third linear side wall that extends at an angle from said second linear base wall.

5. The modular heat exchange tower according to claim 4, wherein said second flume further comprises a second top linear wall that extends between said third and fourth linear sidewalls generally parallel to the second linear base wall.

6. The modular heat exchange tower according to claim 5, wherein said second flume is trapezoidal in geometry.

7. The modular heat exchange tower according to claim 2, wherein said first basin comprises a first depressed section; said second basin comprises a second depressed section and said third module comprises a third depressed section.

8. The modular heat exchange tower according to claim 7, wherein said first, second and third depressed sections are in fluid communication with one another.

9. The modular heat exchange tower according to claim 2, further comprising a second heat exchange section.

10. The modular heat exchange tower according to claim 9, further comprising:
    a fourth module; and
    a fifth module,
    wherein the first heat exchange section is disposed in the first module and the fourth module,
    wherein the second heat exchange section is disposed in the third module and the fifth module.

11. The modular heat exchange tower according to claim 10, wherein the fourth module is positioned vertically adjacent to the first module along a first axis parallel to the longitudinal axis,
    wherein the fifth module is positioned vertically adjacent to the third module along a second axis parallel to the longitudinal axis.

12. The modular heat exchange tower according to claim 11, wherein the first heat exchange section is disposed in the first module and the fourth module is further disposed vertically adjacent to the first basin along the first axis parallel to the longitudinal axis,
    wherein the second heat exchange section disposed in the third module and the fifth module is further disposed vertically adjacent to the third basin along the second axis parallel to the longitudinal axis.

13. The modular heat exchange tower according to claim 12, further comprising a sixth module,
    wherein the sixth module comprises at least a portion of the air current generator.

14. The modular heat exchange tower according to claim 13, wherein the sixth module is disposed between the fourth module and the fifth module along an axis perpendicular to the longitudinal axis.

15. The modular heat exchange tower according to claim 14, further comprising:
    a third basin; and
    a fourth basin,
    wherein the third basin and the fourth basin are configured to receive separate streams of liquid,
    wherein the third basin is disposed vertically adjacent to the first heat exchange section along the first axis parallel to the longitudinal axis such that the stream of water received by the third basin flows into the first heat exchange section and into the first basin,
    wherein the fourth basin is disposed vertically adjacent to the second heat exchange section along the second axis parallel to the longitudinal axis such that the stream of water received by the fourth basin flows into the second heat exchange section and into the second basin.

16. The modular heat exchange tower according to claim 1, wherein the first heat exchange section comprises cross-flow fill.

17. The modular heat exchange tower according to claim 9, wherein the second heat exchange section comprises cross-flow fill.

18. A modular heat exchange tower, comprising:
    a first fluid basin disposed in a first module;

a second fluid basin disposed in a second module;
a flume that extends between said first fluid basin and said second fluid basin, wherein said flume comprises:
 a linear first base wall;
 a first linear side wall that extends from said first linear base wall at an angle; and
 a second linear side wall that opposes said first linear side wall that extends at an angle from said first linear base wall, wherein said flume further comprises a first top linear wall that extends between said first and second linear sidewalls generally parallel to the first linear base wall.

\* \* \* \* \*